United States Patent
Tsuji et al.

(10) Patent No.: US 10,811,729 B2
(45) Date of Patent: Oct. 20, 2020

(54) NONAQUEOUS ELECTROLYTE SECONDARY BATTERY

(71) Applicant: Panasonic Intellectual Property Management Co., Ltd., Osaka-shi, Osaka (JP)

(72) Inventors: Tomoki Tsuji, Osaka (JP); Masahiro Shiraga, Osaka (JP); Manabu Takijiri, Osaka (JP); Takayuki Shirane, Osaka (JP); Hiroyuki Fujimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 226 days.

(21) Appl. No.: 15/957,047

(22) Filed: Apr. 19, 2018

(65) Prior Publication Data

US 2018/0241087 A1 Aug. 23, 2018

Related U.S. Application Data

(63) Continuation of application No. PCT/JP2016/004414, filed on Sep. 30, 2016.

(30) Foreign Application Priority Data

Oct. 30, 2015 (JP) .................... 2015-214263

(51) Int. Cl.
*H01M 10/0569* (2010.01)
*H01M 10/0525* (2010.01)
(Continued)

(52) U.S. Cl.
CPC ......... *H01M 10/0569* (2013.01); *H01M 2/36* (2013.01); *H01M 4/131* (2013.01);
(Continued)

(58) Field of Classification Search
CPC combination set(s) only.
See application file for complete search history.

(56) References Cited

U.S. PATENT DOCUMENTS

| 2005/0053833 A1* | 3/2005 | Hayashida | .......... H01M 4/0404 429/209 |
|---|---|---|---|
| 2010/0136394 A1 | 6/2010 | Miyahisa et al. | |

(Continued)

FOREIGN PATENT DOCUMENTS

| CN | 101675544 A | | 3/2010 |
|---|---|---|---|
| JP | H11154508 | * | 6/1999 |

(Continued)

OTHER PUBLICATIONS

JPH11154508 English translation. Yajima et al. Japan. Jun. 8, 1999. (Year: 1999).*

(Continued)

*Primary Examiner* — Christopher P Domone
(74) *Attorney, Agent, or Firm* — Westerman, Hattori, Daniels & Adrian, LLP

(57) ABSTRACT

A nonaqueous electrolyte secondary battery includes a positive electrode including a positive electrode mix layer, a negative electrode including a negative electrode mix layer, and a nonaqueous electrolyte containing a nonaqueous solvent. A surface of the negative electrode mix layer is provided with grooves. The nonaqueous electrolyte contains 10 volume percent or more of a fluorinated solvent with respect to the volume of the nonaqueous solvent and has a viscosity (25° C.) of 3.50 mPa·s or more as measured with a differential pressure viscometer.

6 Claims, 2 Drawing Sheets

(51) Int. Cl.
*H01M 10/0587* (2010.01)
*H01M 4/525* (2010.01)
*H01M 4/131* (2010.01)
*H01M 2/36* (2006.01)
*H01M 4/02* (2006.01)

(52) U.S. Cl.
CPC ....... *H01M 4/525* (2013.01); *H01M 10/0525* (2013.01); *H01M 10/0587* (2013.01); *H01M 2004/025* (2013.01); *H01M 2004/028* (2013.01); *H01M 2300/0034* (2013.01)

(56) References Cited

U.S. PATENT DOCUMENTS

| | | |
|---|---|---|
| 2011/0064998 A1 | 3/2011 | Abe et al. |
| 2014/0356724 A1* | 12/2014 | Iwami ................. H01M 4/587 429/231.4 |
| 2015/0050564 A1 | 2/2015 | Mizuno et al. |

FOREIGN PATENT DOCUMENTS

| | | |
|---|---|---|
| JP | 2008-192383 A | 8/2008 |
| JP | 2009-43718 A | 2/2009 |
| JP | 2012-28054 A | 2/2012 |
| JP | 2013-182807 A | 9/2013 |
| WO | 2009/113545 A1 | 9/2009 |
| WO | 2013/094668 A1 | 6/2013 |
| WO | WO2013094668 * | 6/2013 |

OTHER PUBLICATIONS

International Search Report dated Dec. 6, 2016, issued in counterpart International Application No. PCT/JP2016/004414 (2 pages).
English Translation of Search Report dated Jun. 24, 2020, issued in counterpart to CN Application No. 201680061731.4 (2 pages).

* cited by examiner

NONAQUEOUS ELECTROLYTE SECONDARY BATTERY

TECHNICAL FIELD

The present disclosure relates to a nonaqueous electrolyte secondary battery.

BACKGROUND ART

Hitherto, nonaqueous electrolyte secondary batteries in which a fluorinated solvent is used as a nonaqueous solvent for nonaqueous electrolytes have been known. For example, Patent Literature 1 discloses a nonaqueous electrolyte secondary battery improved in conductivity and thermal stability using a nonaqueous electrolyte containing a hydrocarbon solvent and fluorinated solvent that are in an immiscible state.

Incidentally, in nonaqueous electrolyte secondary batteries, improving rapid discharge cycle characteristics is an important issue. Since fluorinated solvents are excellent in oxidation resistance, the use thereof enables, for example, rapid discharge cycle characteristics at room temperature to be improved.

CITATION LIST

Patent Literature

PTL 1: Japanese Published Unexamined Patent Application No. 2012-28054

SUMMARY OF INVENTION

In the case of using a fluorinated solvent in a nonaqueous electrolyte, it has become clear that although rapid discharge cycle characteristics at room temperature are improved as described above, rapid discharge cycle characteristics at a temperature (for example, 45° C.) higher than room temperature are instead impaired. That is, it is an object of the present disclosure to provide a nonaqueous electrolyte secondary battery with excellent rapid discharge cycle characteristics under circumstances where the environmental temperature is high.

A nonaqueous electrolyte secondary battery according to an aspect of the present disclosure is a nonaqueous electrolyte secondary battery including a positive electrode including a positive electrode mix layer, a negative electrode including a negative electrode mix layer, and a nonaqueous electrolyte containing a nonaqueous solvent. A surface of at least one of the positive electrode mix layer and the negative electrode mix layer is provided with grooves. The nonaqueous electrolyte contains 10 volume percent or more of a fluorinated solvent with respect to the volume of the nonaqueous solvent and has a viscosity (25° C.) of 3.50 mPa·s or more as measured with a differential pressure viscometer.

In accordance with a nonaqueous electrolyte secondary battery according to an aspect of the present disclosure, excellent rapid discharge cycle characteristics are obtained regardless of temperature conditions.

DESCRIPTION OF EMBODIMENTS

Figure 1:
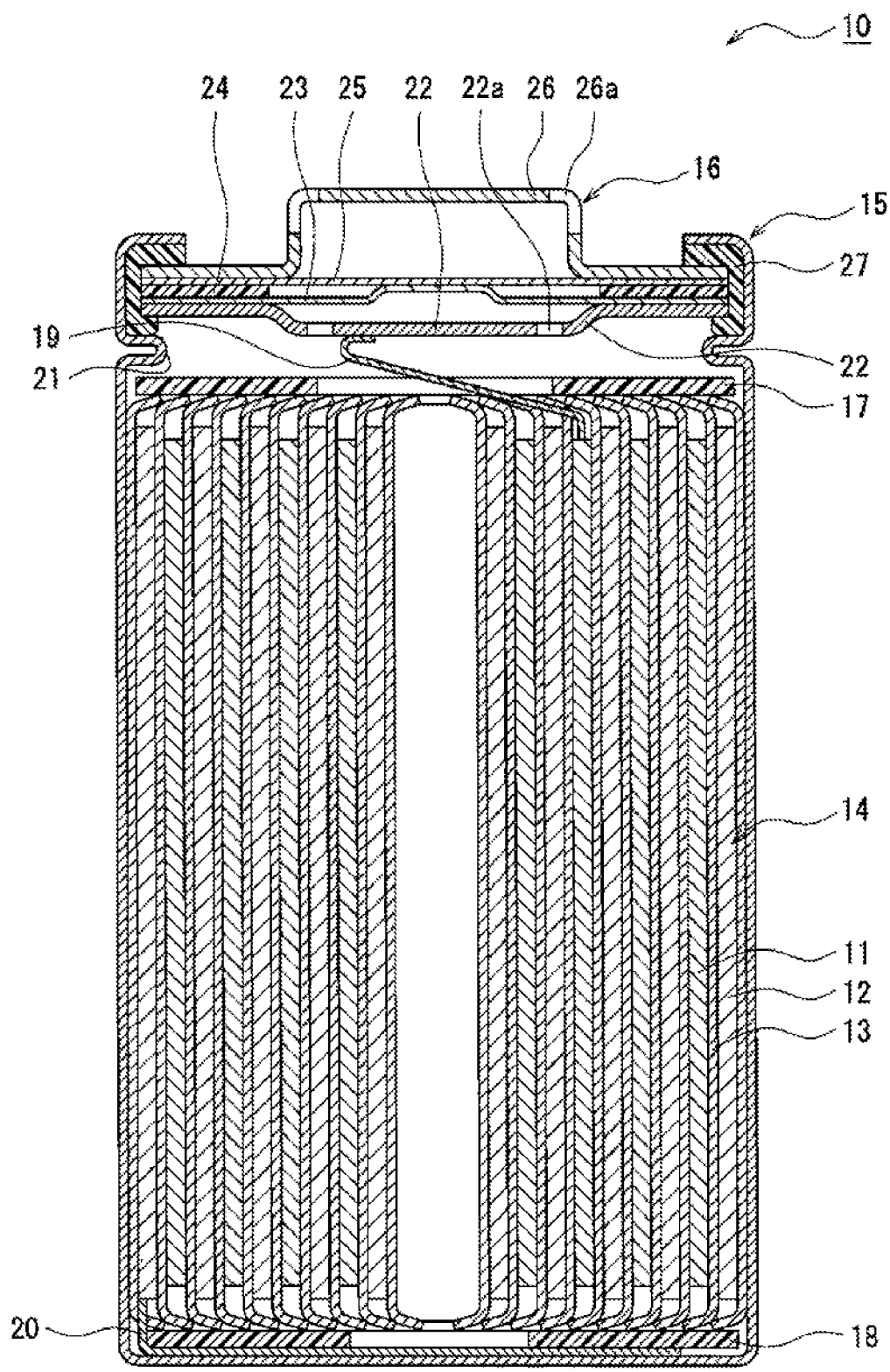
FIG. 1 is a sectional view of a nonaqueous electrolyte secondary battery that is an example of an embodiment.

A nonaqueous electrolyte secondary battery according to an aspect of the present disclosure contains 10 volume percent or more of a fluorinated solvent with high oxidation resistance with respect to the volume of a nonaqueous solvent for the purpose of suppressing the decomposition of a nonaqueous electrolyte to enhance rapid discharge cycle characteristics. This allows rapid discharge cycle characteristics (for example, discharge cycle characteristics at 25° C.·1 C) at room temperature to be improved as compared to the case where the fluorinated solvent is not used or the case where the content thereof is less than 10 volume percent. Incidentally, the inventors have ascertained that rapid discharge cycle characteristics (for example, discharge cycle characteristics at 45° C.·1 C) at a temperature higher than room temperature are instead impaired in the case of using 10 volume percent or more of the fluorinated solvent. It is conceivable that in a discharge cycle at 45° C.·1 C, the fluorinated solvent decomposes to produce a resistance component.

The inventors have performed intensive investigations for the purpose of achieving excellent rapid discharge cycle characteristics under circumstances where the environmental temperature is high. As a result, the inventors have found that excellent rapid discharge cycle characteristics are obtained regardless of temperature conditions in such a manner that the viscosity (25° C.) of a nonaqueous electrolyte is adjusted to 3.50 mPa·s or more as measured with a differential pressure viscometer and a surface of at least one of a positive electrode mix layer and a negative electrode mix layer is grooved. Such an effect is specifically exhibited only in the case where the nonaqueous electrolyte contains 10 volume percent or more of a fluorinated solvent and has a viscosity (25° C.) of 3.50 mPa·s or more as measured with a differential pressure viscometer and a surface of at least one of the positive electrode mix layer and the negative electrode mix layer is grooved.

An example of an embodiment is described below with reference to the attached drawings. The drawings are those schematically illustrated. The dimensional ratio and the like of components depicted in the drawings should be determined in consideration of descriptions below. It has been previously assumed that a plurality of embodiments and modifications are appropriately used in combination.

FIG. 1 is a sectional view of a nonaqueous electrolyte secondary battery 10 that is an example of an embodiment. The nonaqueous electrolyte secondary battery 10 includes a positive electrode 11, a negative electrode 12, and a nonaqueous electrolyte. The nonaqueous electrolyte secondary battery 10 has a configuration in which, for example, a wound electrode assembly 14 formed by winding the positive electrode 11 and the negative electrode 12 with a separator 13 therebetween and the nonaqueous electrolyte are housed in a battery case. An electrode assembly, such as a stacked electrode assembly in which positive electrodes and negative electrodes are alternately stacked with separators therebetween, having another configuration may be used instead of the wound electrode assembly 14. The following cases can be exemplified as the battery case for housing the electrode assembly 14 and the nonaqueous electrolyte: a metal case with a cylindrical shape, a prismatic shape, a coin shape, a button shape, or the like; a resin case formed by laminating resin sheets; and the like. In an example shown in FIG. 1, the battery case is composed of a case body 15 with a bottomed cylindrical shape and a sealing body 16.

In this embodiment, the wound electrode assembly 14 is formed by winding the positive electrode 11 and the negative electrode 12 with the separator 13 therebetween and the positive electrode 11 and the negative electrode 12 are strip-shaped. Descriptions below are based on the assumption that an electrode assembly has a wound structure unless otherwise specified.

The nonaqueous electrolyte secondary battery 10 includes an insulating plate 17 and insulating plate 18 placed on the top and bottom, respectively, of the electrode assembly 14. In the example shown in FIG. 1, a positive electrode lead 19 attached to the positive electrode 11 extends to the sealing body 16 side through a through-hole in the insulating plate 17 and a negative electrode lead 20 attached to the negative electrode 12 extends to the bottom side of the case body 15 through the outside of the insulating plate 18. For example, the positive electrode lead 19 is connected to the lower surface of a filter 22 that is a bottom plate of the sealing body 16 by welding or the like. The sealing body 16 is electrically connected to the filter 22 and a cap 26 that is a top plate of the sealing body 16 serves as a positive electrode terminal. The negative electrode lead 20 is connected to an inner surface of a bottom section of the case body 15 by welding or the like. The case body 15 serves as a negative electrode terminal. In this embodiment, the sealing body 16 is provided with a current blocking mechanism and a gas release mechanism (safety valve).

The case body 15 is, for example, a metal container with a bottomed cylindrical shape. A gasket 27 is placed between the case body 15 and the gasket 27, whereby the airtightness inside the battery case is ensured. The case body 15 preferably includes, for example, a projecting section 21, formed by pressing a side section thereof from the outside, supporting the sealing body 16. The projecting section 21 is preferably annularly formed along a circumferential direction of the case body 15 and supports the sealing body 16 with the upper surface thereof.

The sealing body 16 includes the filter 22, which is provided with filter openings 22a, and valve discs which are placed on the filter 22 and which block the filter openings 22a. In this embodiment, the valve discs are a lower valve disc 23 and an upper valve disc 25, an insulating member 24 is placed between the lower valve disc 23 and the upper valve disc 25, and a cap 26 having cap openings 26a is further placed. Members forming the sealing body 16 have, for example, a disk shape or a ring shape and the members excluding the insulating member 24 are electrically connected to each other. In particular, a peripheral portion of the filter 22 and a peripheral portion of the lower valve disc 23 are bonded to each other and a peripheral portion of the upper valve disc 25 and a peripheral portion of the cap 26 are bonded to each other. A central portion of the lower valve disc 23 and a central portion of the upper valve disc 25 are connected to each other and the insulating member 24 is interposed between the peripheral portions thereof. If the internal pressure is increased by heat generation due to internal short-circuiting or the like, for example, a thin portion of the lower valve disc 23 is fractured. This swells the upper valve disc 25 toward the cap 26 to separate the upper valve disc 25 from the lower valve disc 23, whereby the electrical connection therebetween is broken.

Components of the nonaqueous electrolyte secondary battery 10 are described below in detail.

Positive Electrode

The positive electrode is preferably composed of, for example, a positive electrode current collector made of metal foil or the like and positive electrode mix layers formed on the positive electrode current collector. The positive electrode current collector used may be foil of a metal, such as aluminium, stable within the potential range of the positive electrode; a film including a surface layer made of the metal; or the like. It is preferable that the positive electrode mix layers contain a positive electrode active material, a conductive material, and a binding material and are placed on both surfaces of the current collector.

A lithium composite oxide containing a transition metal element such as Ni, Co, or Mn can be exemplified as the positive electrode active material. Examples of the lithium composite oxide include $Li_xCoO_2$, $Li_xNiO_2$, $Li_xMnO_2$, $Li_xCo_yNi_{1-y}O_2$, $Li_xCo_yM_{1-y}O_2$, $Li_xNi_{1-y}M_yO_z$, $Li_xMn_2O_4$, $Li_xMn_{2-y}M_yO_4$, $LiMPO_4$, and $Li_2MPO_4F$ ($0<x\leq1.2$, $0<y\leq0.9$, $2.0\leq z\leq2.3$, and M is at least one of Na, Mg, Sc, Y, Mn, Fe, Co, Ni, Cu, Zn, Al, Cr, Pb, Sb, and B). These may be used alone or in combination.

From the viewpoint of high capacity, low cost, and the like, the positive electrode active material preferably mainly contains a lithium-nickel composite oxide in which Ni accounts for more than 80 mole percent of the total amount of metal elements excluding Li. The positive electrode active material contains 50 mass percent or more of the lithium-nickel composite oxide with respect to the total mass thereof, 80 mass percent or more thereof, or 100 mass percent thereof. The lithium-nickel composite oxide is preferably a composite oxide represented by the general formula $Li_xNi_yM_{1-y}O_2$ ($0<x<1.1$, $0.8<y$, and M is at least one of Na, Mg, Sc, Y, Mn, Fe, Co, Ni, Cu, Zn, Al, Cr, Pb, Sb, and B).

Carbon materials such as carbon black, acetylene black, Ketjenblack, and graphite can be exemplified as the conductive material contained in the positive electrode mix layers. These may be used alone or in combination.

The following resins can be exemplified as the binding material contained in the positive electrode mix layers: fluorinated resins such as polytetrafluoroethylene (PTFE), polyvinylidene fluoride; (PVdF); polyacrylonitrile (PAN), polyimide resins, acrylic resins, and polyolefin resins. These resins may be used in combination with carboxymethylcellulose (CMC), a salt thereof, polyethylene oxide (PEO), or the like. These may be used alone or in combination.

Negative Electrode

The negative electrode is preferably composed of, for example, a negative electrode current collector made of metal foil or the like and negative electrode mix layers formed on the negative electrode current collector. The negative electrode current collector used may be foil of a metal, such as copper, stable within the potential range of the negative electrode; a film including a surface layer made of the metal; or the like. It is preferable that the negative electrode mix layers contain a negative electrode active material and a binding material and are placed on both surfaces of the current collector.

The negative electrode active material is not particularly limited and may be one capable of reversibly intercalating and deintercalating lithium ions. The negative electrode active material used may be, for example, a carbon material such as natural graphite or synthetic graphite; a metal, such as Si or Sn, alloying with lithium; an alloy containing a metal element, such as Si or Sn; a composite oxide; or the like. Negative electrode active materials may be used alone or in combination.

As is the case with the positive electrode, fluorinated resins, polyacrylonitrile (PAN), polyimide resins, acrylic resins, polyolefin resins, and the like can be used as the binding material contained in the negative electrode mix layers. In the case of preparing mix slurry using an aqueous solvent, it is preferable to use CMC, a salt thereof, styrene-butadiene rubber (SBR), polyacrylic acid (PAA), a salt thereof, polyvinyl alcohol (PVA), or the like.

Figure 2:
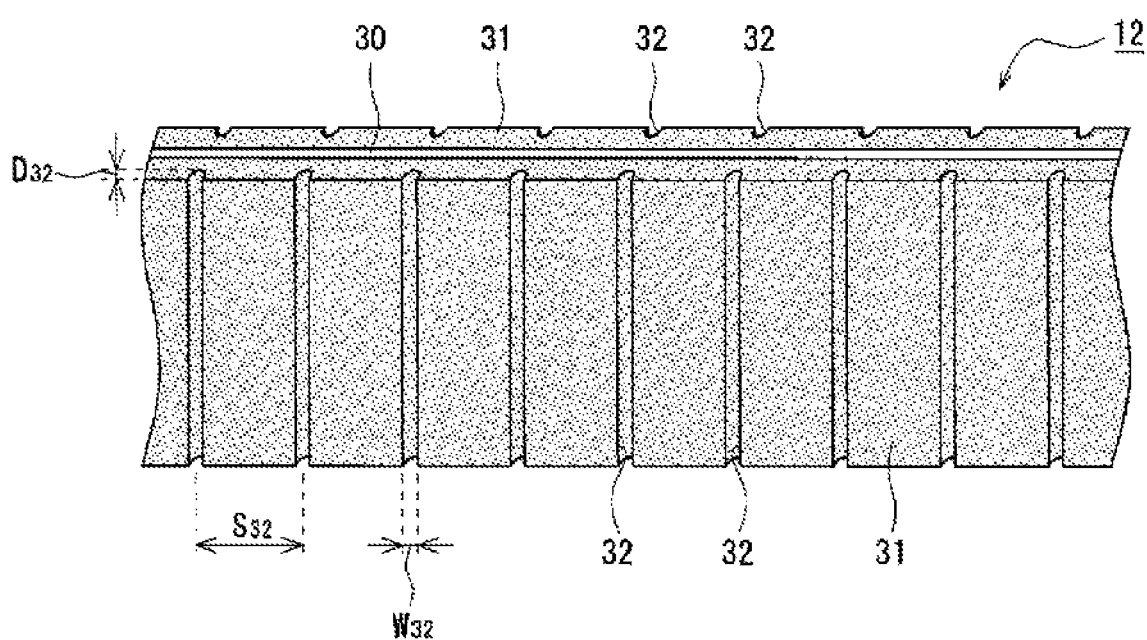
FIG. 2 is a perspective view of a portion of a negative electrode that is an example of an embodiment.

FIG. 2 is a perspective view of a portion of a negative electrode 12 that is an example of an embodiment. As shown in FIG. 2, a surface of each negative electrode mix layer 31 is provided with grooves 32. The grooves 32 are concave sections functioning as channels through which the non-aqueous electrolyte (electrolyte solution) flows. The grooves 32 have, for example, substantially a U-shape or trapezoidal shape in transverse cross section. A surface portion of the negative electrode mix layer 31 that is provided with no grooves 32 is preferably substantially flat. That is, it can be said that a concave portion that is a portion provided with the grooves 32 and a convex portion that is a portion provided with no grooves 32 are present on the surface of the negative electrode mix layer 31 and the surface of the negative electrode mix layer 31 is embossed.

The electrolyte solution is extruded through, for example, a gap in an electrode assembly by the change in volume of the electrode assembly in association with charge and discharge. The grooves 32 enhance the permeability of the electrolyte solution through the electrode assembly. Although the electrolyte solution has high viscosity as described below in detail, enhancing the permeability of the electrolyte solution through the electrode assembly by the presence of the grooves 32 enables the uneven distribution of the electrolyte solution in the electrode assembly, that is, so-called liquid unevenness to be suppressed and allows the decomposition of the electrolyte solution due to liquid unevenness to be suppressed.

In this embodiment, the negative electrode mix layer 31 is provided with the grooves 32. The positive electrode mix layers may be provided with grooves. Both of the positive electrode mix layers and the negative electrode mix layers may be provided with grooves. The configuration of the grooves 32 that is described below is applicable to grooves formed in the positive electrode mix layers.

The negative electrode 12 preferably includes the negative electrode mix layers 31, which are placed on both surfaces of a negative electrode current collector 30 as described above. The grooves 32 are preferably placed in each negative electrode mix layer 31. In an example shown in FIG. 2, the grooves 32 placed in the negative electrode mix layers 31 substantially overlap each other in a thickness direction of the negative electrode 12. The positional relationship between the grooves 32 in the thickness direction of the negative electrode 12 is not particularly limited. For example, the grooves 32 in the negative electrode mix layers 31 may be placed so as not to overlap each other in the thickness direction of the negative electrode 12. In this case, the negative electrode 12 has increased rupture strength.

The grooves 32 may be placed only in, for example, a transverse central portion of each negative electrode mix layer 31. In order to enhance the permeability of the electrolyte solution through the electrode assembly, the grooves 32 are preferably placed across the full width of the negative electrode mix layer 31. Incidentally, a transverse direction, longitudinal direction, and thickness direction of the negative electrode mix layer 31 are the same as a transverse direction, longitudinal direction, and thickness direction, respectively, of the negative electrode 12. In the example shown in FIG. 2, the grooves 32 are placed in almost parallel to the transverse direction of the negative electrode mix layer 31. The grooves 32 may extend to cross each other in the transverse and longitudinal directions of the negative electrode mix layer 31. Also in this case, the grooves 32 are preferably placed across the full width of the negative electrode mix layer 31.

The grooves 32 are preferably placed at a predetermined spacing $S_{32}$ in the longitudinal direction of the negative electrode mix layer 31. That is, a plurality of the grooves 32 are preferably arranged in the longitudinal direction of the negative electrode mix layer 31. The spacing $S_{32}$ refers to the distance between the centers (transverse centers) of the neighboring grooves 32. The spacing $S_{32}$ is preferably 1.1 mm to 4.0 mm and particularly preferably 1.3 mm to 3.3 mm. In the example shown in FIG. 2, a plurality of the grooves 32 are placed at regular spacing. For example, the spacing $S_{32}$ need not be regular.

The depth $D_{32}$ of the grooves 32 is preferably a depth corresponding to 10 percent to 30 percent of the thickness of the negative electrode mix layer 31 and particularly preferably a depth corresponding to 15 percent to 25 percent. The depth $D_{32}$ is preferably, for example, 15 percent to 22 percent. The width $W_{32}$ of the grooves 32 is preferably 0.1 mm to 1.0 mm and particularly preferably 0.5 mm to 0.9 mm. Forming the grooves 32 such that the spacing $S_{32}$ is 1.1 mm to 4.0 mm, the depth $D_{32}$ is 10 percent to 30 percent of the thickness of the negative electrode mix layer 31, and the width $W_{32}$ is 0.1 mm to 1.0 mm enhances the permeability of the electrolyte solution through the electrode assembly and enables the above-mentioned liquid unevenness to be sufficiently suppressed even in the case of using a high-viscosity electrolyte solution.

The grooves 32 can be formed in such a manner that after negative electrode mix slurry containing the negative electrode active material, the binding material, and the like is applied to the negative electrode current collector 30, coating films are rolled using a roller having surface bumps. Since portions pressed by the bumps are converted into the grooves 32, the condition of the grooves 32 formed in a surface of the negative electrode mix layer 31 can be varied by adjusting the number, distance, size, or the like of the bumps. By feeding, for example, a negative electrode precursor in which coating films of negative electrode mix slurry are placed on both surfaces of a current collector between two rollers having surface bumps, the negative electrode 12 can be prepared such that the grooves 32 are formed in the negative electrode mix layers 31.

Nonaqueous Electrolyte

The nonaqueous electrolyte contains a nonaqueous solvent and an electrolyte salt dissolved in the nonaqueous solvent. The nonaqueous electrolyte contains 10 volume percent or more of a fluorinated solvent with respect to the volume of the nonaqueous solvent and has a viscosity (25° C.) of 3.50 mPa·s or more as measured with a differential pressure viscometer. Grooving a surface of at least one of the positive electrode mix layers and the negative electrode mix layers as described above in addition to the two conditions allows excellent rapid discharge cycle characteristics to be obtained even under, for example, 25° C. or 45° C. temperature conditions.

The content of the fluorinated solvent is preferably 10 volume percent to 50 volume percent with respect to the volume of the nonaqueous solvent, more preferably 10 volume percent to 30 volume percent, and particularly preferably 10 volume percent to 20 volume percent. That is, the nonaqueous solvent preferably contains the fluorinated solvent and a non-fluorinated solvent. Examples of the non-fluorinated solvent, which is used in combination with the fluorinated solvent, include esters, ethers, nitriles such as acetonitrile, amides such as dimethylformamide, and solvent mixtures of two or more of these compounds. Incidentally, the fluorinated solvent is one obtained by substituting at least one portion of hydrogen in these solvents with fluorine.

The fluorinated solvent may be a linear fluorinated solvent such as a fluorinated linear carbonate or a fluorinated linear carboxylate and preferably includes at least one type of cyclic fluorinated solvent. An example of a cyclic fluorinated solvent is a fluorinated cyclic carbonate such as fluorinated ethylene carbonate (FEC) or fluorinated propylene carbonate. In particular, FEC is preferable. Examples of FEC include 4-fluoroethylene carbonate (monofluoroethylene carbonate), 4,5-difluoroethylene carbonate, 4,4-difluoroethylene carbonate, 4,4,5-trifluoroethylene carbonate, and 4,4,5,5-tetrafluoroethylene carbonate. In particular, 4-fluoroethylene carbonate is preferable. Hereinafter, fluorinated ethylene carbonate (FEC) refers to 4-fluoroethylene carbonate unless otherwise specified.

Examples of the esters include cyclic carbonates such as ethylene carbonate (EC), propylene carbonate (PC), and butylene carbonate; linear carbonates such as dimethyl carbonate (DMC), ethyl methyl carbonate (EMC), diethyl carbonate (DEC), methyl propyl carbonate, ethyl propyl carbonate, and methyl isopropyl carbonate; cyclic carboxylates such as γ-butyrolactone and γ-valerolactone; and linear carboxylates such as methyl acetate, ethyl acetate, propyl acetate, methyl propionate (MP), ethyl propionate, and γ-butyrolactone.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol, and crown ethers and linear ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl, ether, and tetraethylene glycol dimethyl ether.

A preferable example of the nonaqueous solvent is a solvent mixture in which fluorinated ethylene carbonate (FEC) is used as a fluorinated solvent and at least one selected from ethyl methyl carbonate (EMC), ethylene carbonate (EC), dimethyl carbonate (DMC), and ethyl methyl carbonate (EMC) is used as a non-fluorinated ethylene carbonate. When the nonaqueous solvent contains, for example, EMC, the content thereof is preferably 50 volume percent to 90 volume percent with respect to the volume of the nonaqueous solvent and more preferably 70 volume percent to 90 volume percent. Alternatively, when the nonaqueous solvent contains EC, the content thereof is preferably 1 volume percent to 20 volume percent with respect to the volume of the nonaqueous solvent and more preferably 3 volume percent to 15 volume percent.

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4$, $LiPF_{6-x}(C_nF_{2n+1})_x$ ($1<x<6$ and n is 1 or 2), $LiB_{10}Cl_{10}$, LiCl, LiBr, LiI, chloroborane lithium, lithium lower aliphatic carboxylates, borates such as $Li_2B_4O_7$ and $Li(B(C_2O_4)F_2)$; and imide salts such as $LiN(SO_2CF_3)_2$ and $LiN(C_1F_{2l+1}SO_2)(C_mF_{2m+1}SO_2)$ (l and m are integers not less than 1). For the lithium salt, these may be used alone or in combination. The concentration of the lithium salt is preferably 0.8 moles to 1.8 moles per liter of the nonaqueous solvent.

The nonaqueous solvent has a viscosity (25° C.) of 3.50 mPa·s or more as measured with a differential pressure viscometer as described above. The viscosity of the nonaqueous solvent is measured with the differential pressure viscometer in a 25° C.±0.5° C. environment under conditions including a flow rate of 425 μL/min using a sensor chip which was B-10. When the viscosity of the nonaqueous solvent is less than 3.50 mPa·s, the fluorinated solvent is likely to decompose to produce a resistance component in the case of repeating rapid discharge in a high-temperature environment and rapid discharge cycle characteristics at, for example, 45° C.·1 C decrease in the case where no fluorinated solvent is used. The viscosity of the nonaqueous solvent is preferably 3.5 mPa·s to 5.0 mPa·s and particularly preferably 3.5 mPa·s to 4.0 mPa·s.

Separator

The separator used is a porous sheet having ionic permeability and insulation properties. Examples of the porous sheet include microporous thin films, fabrics, and nonwoven fabrics. The separator is preferably made of an olefin resin such as polyethylene or polypropylene or cellulose. The separator may be a laminate including a cellulose fiber layer and a thermoplastic resin fiber layer made of the olefin resin or the like. The separator may be a multilayer separator including a polyethylene layer and a polypropylene layer or a separator surface-coated with an aramid resin or the like.

A filler layer containing an inorganic filler may be placed at the interface between the separator and at least one of the positive electrode and the negative electrode. Examples of the inorganic filler include oxides containing at least one of Ti, Al, Si, and Mg and phosphate compounds. The filler layer can be formed by applying, for example, slurry containing the filler to a surface of the positive electrode, the negative electrode, or the separator.

EXAMPLES

The present disclosure is further described below with reference to examples. The present disclosure is not limited to the examples.

Example 1

Preparation of Positive Electrode

A positive electrode active material used was a lithium composite oxide represented by the general formula $LiNi_{0.8}Co_{0.15}Al_{0.05}O_2$. The positive electrode active material, acetylene black, and polyvinylidene fluoride were mixed so as to account for 100 mass percent, 1 mass percent, and 0.9 mass percent, respectively, followed by adding N-methyl-2-pyrrolidone (NMP) thereto, whereby positive electrode mix slurry was prepared. The positive electrode mix slurry was applied to both surfaces of a positive electrode current-collector, made of aluminium, having a thickness of 15 μm by a doctor blade method, followed by rolling coating films, whereby a positive electrode including the current collector and positive electrode mix layers, formed on both surfaces of the current collector, having a thickness of 70 μm was prepared.

Preparation of Negative Electrode

Graphite (a negative electrode active material) and a styrene-butadiene copolymer (SBR) were mixed so as to account for 100 mass percent and 1 mass percent, respectively, followed by adding water thereto, whereby negative electrode mix slurry was prepared. The negative electrode mix slurry was applied to both surfaces of a positive electrode current collector, made of copper, having a thickness of 10 μm by a doctor blade method, followed by rolling coating films, whereby a negative electrode including the current collector and negative electrode mix layers, formed on both surfaces of the current collector, having a thickness of 100 μm was prepared.

A roller having surface bumps was used to roll the coating films. Grooves formed in a surface of each negative electrode mix layer extended in almost parallel to a transverse direction of the negative electrode mix layer. The spacing $S_{32}$, depth $D_{32}$, and width $W_{32}$ (see FIG. 2) were as described below.

Spacing $S_{32}$: 2.0 mm
Depth $D_{32}$: 20 μm
Width $W_{32}$: 0.7 mm
Length: equal to the width of the negative electrode mix layer

Preparation of Nonaqueous Electrolyte (Electrolyte Solution)

An electrolyte solution was prepared in such a manner that $LiPF_6$ was dissolved in a solvent mixture of fluorinated ethylene carbonate (FEC) and ethyl methyl carbonate (EMC) mixed at a volume ratio of 15:85 so as to give a concentration of 1.2 mol/L. The electrolyte solution had a viscosity (25° C.) of 3.51 mPa·s. Conditions for measuring the viscosity of the electrolyte solution were as described below.

Instrument: differential pressure viscometer (VROC-1000 manufactured by Rheosense Inc.)
Temperature: 25° C.±0.5° C.
Sensor chip: B-10
Flow rate: 425 μL/min

Preparation of Nonaqueous Electrolyte Secondary Battery (Cylinder-Type Battery)

A cylinder-type battery was prepared using the positive electrode and the negative electrode. First, the positive electrode and the negative electrode were cut to sizes below, electrode tabs were attached thereto, and the positive electrode and the negative electrode were wound with a separator made of PP therebetween, whereby a wound electrode assembly was prepared.

Positive electrode: a short side length of 55 mm and a long side length of 450 mm
Negative electrode: a short side length of 57 mm and a long side length of 550 mm Next, the electrode assembly was housed in an enclosure can, made of steel, having a diameter of 18 mm and a height of 65 mm in such a state that insulating plates were placed on the top and bottom of the electrode assembly, a negative electrode tab was welded to an inside bottom portion of the battery enclosure can, and a positive electrode tab was welded to a bottom plate portion of a sealing body. The electrolyte solution was poured into the enclosure can from an opening thereof, followed by sealing the enclosure can with the sealing body, whereby the cylinder-type battery was prepared.

Comparative Example 1

A battery was prepared in substantially the same manner as that used in Example 1 except that coating films of negative electrode mix slurry were rolled using a roller having no surface bumps such that no grooves were formed in surfaces of negative electrode mix layers.

Example 2

A battery was prepared in substantially the same manner as that used in Example 1 except that a solvent mixture of FEC, EMC, and EC mixed at a volume ratio of 10:80:10 was used as a nonaqueous solvent for an electrolyte solution. The electrolyte solution had a viscosity (25° C.) of 3.88 mPa·s as measured with a differential pressure viscometer.

Comparative Example 2

A battery was prepared in substantially the same manner as that used in Example 1 except that a solvent mixture of FEC, EMC, and EC mixed at a volume ratio of 10:85:5 was used as a nonaqueous solvent for an electrolyte solution. The electrolyte solution had a viscosity (25° C.) of 3.46 mPa·s as measured with a differential pressure viscometer.

Comparative Example 3

A battery was prepared in substantially the same manner as that used in Example 1 except that a solvent mixture of EMC and EC mixed at a volume ratio of 85:15 was used as a nonaqueous solvent for an electrolyte solution. The electrolyte solution had a viscosity (25° C.) of 3.58 mPa·s as measured with a differential pressure viscometer.

Comparative Example 4

A battery was prepared in substantially the same manner as that used in Example 1 except that a solvent mixture of FEC, EMC, and DMC mixed at a volume ratio of 20:5:75 was used as a nonaqueous solvent for an electrolyte solution. The electrolyte solution had a viscosity (25° C.) of 3.23 mPa·s as measured with a differential pressure viscometer.

Comparative Example 5

A battery was prepared in substantially the same manner as that used in Comparative Example 4 except that coating films of negative electrode mix slurry were rolled using a roller having no surface bumps such that no grooves were formed in surfaces of negative electrode mix layers.

Evaluation of Capacity Retention (Rapid Discharge Cycle Characteristic)

The battery of each of the examples and the comparative examples was charged at a constant current of 0.3 C at 25° C. until the voltage of the battery reached 4.2 V, followed by discharging the battery at a constant current of 1 C until the battery voltage reached 3.0 V. This charge/discharge cycle was repeated 200 times. The capacity retention (%) at 25° C. was determined in such a manner that the value obtained by dividing the 200th-cycle capacity retention by the first-cycle capacity retention was multiplied by 100. Furthermore, the same charge/discharge test was carried out in such a manner that the temperature of an environment was set to 45° C., whereby the capacity retention (%) at 45° C. was determined.

Evaluation of Rate of Change in Direct-Current Resistance (DCIR)

The battery of each of the examples and the comparative examples was charged at a constant current of 0.3 C at 25° C. until the voltage of the battery reached 4.2 V, followed by discharging the battery at a constant current of 0.5 C for 10 seconds. The direct-current resistance was determined from the change in voltage before and after the discharge and the discharge current. The direct-current resistance was evaluated in the first cycle and 200th cycle of the above rapid discharge cycle test. The rate of change in direct-current resistance (%) at 25° C. was determined in such a manner that the value obtained by dividing the 200th-cycle direct-current resistance by the first-cycle direct-current resistance was multiplied by 100. Furthermore, the same charge/discharge test was carried out in such a manner that the temperature of an environment was set to 45° C., whereby the rate of change in direct-current resistance (%) at 4.5° C. was determined.

TABLE 1

| | Fluorinated solvent (% by volume) | Viscosity of electrolyte solution (mPa · s) | Presence or absence of grooves | Capacity retention at 25° C. (%) | Rate of change in DCIR at 25° C. (%) | Capacity retention at 45° C. (%) | Rate of change in DCIR at 45° C. (%) |
|---|---|---|---|---|---|---|---|
| Comparative Example 1 | 15 | 3.51 | Absent | 94 | 126.4 | 88.1 | 180.8 |
| Comparative Example 3 | 0 | 3.58 | Present | 90.1 | — | 90.5 | — |
| Comparative Example 4 | 0 | 3.23 | Present | 90 | — | 90.3 | — |
| Comparative Example 5 | 0 | 3.23 | Absent | 90.1 | — | 90.4 | — |

TABLE 2

| | Fluorinated solvent (% by volume) | Viscosity of electrolyte solution (mPa · s) | Presence or absence of grooves | Capacity retention at 25° C. (%) | Rate of change in DCIR at 25° C. (%) | Capacity retention at 45° C. (%) | Rate of change in DCIR at 45° C. (%) |
|---|---|---|---|---|---|---|---|
| Example 1 | 15 | 3.51 | Present | 94.4 | 126.7 | 90.5 | 175.3 |
| Comparative Example 1 | 15 | 3.51 | Absent | 94 | 126.4 | 88.1 | 180.8 |
| Example 2 | 10 | 3.88 | Present | 92 | — | 90.7 | — |
| Comparative Example 2 | 10 | 3.46 | Present | 92.1 | — | 88.5 | — |

Table 1 is one for describing an effect in the case of using a fluorinated solvent for a nonaqueous electrolyte. The battery of Comparative Example 1, in which a fluorinated solvent is used for a nonaqueous electrolyte, has improved rapid discharge cycle characteristics at 25° C. as compared to the batteries of Comparative Examples 3 to 5, in which a nonaqueous electrolyte contains no fluorinated solvent. However, the battery of Comparative Example 1 has impaired rapid discharge cycle characteristics at 45° C. as compared to the batteries of Comparative Examples 3 to 5. Herein, experiment results of the batteries of Comparative Examples 3 to 5 show that when a nonaqueous electrolyte contains no fluorinated solvent, the presence or absence of grooves and the viscosity of an electrolyte solution are not any factors affecting the capacity retention at each temperature.

Table 2 is one for describing an effect in the case where a fluorinated solvent is used for a nonaqueous electrolyte and a mix layer has grooves. The battery of each of Examples 1 and 2 and Comparative Examples 1 and 2 is a battery in which a fluorinated solvent is used for a nonaqueous electrolyte. In a comparison between the battery of Example 1, in which a nonaqueous electrolyte contains 15 volume percent of a fluorinated solvent, and the battery of Comparative Example 1, the battery of Example 1, in which mix layers have grooves, has improved rapid discharge cycle characteristics at 45° C. as compared to the battery of Comparative Example 1, in which mix layers have no grooves. The difference between the battery of Example 2 and the battery of Comparative Example 2 is the viscosity of an electrolyte solution. The battery ox Comparative Example 2, in which the viscosity of the electrolyte solution is less than 3.50 mPa·s, has significantly reduced rapid discharge cycle characteristics at 45° C. as compared to the battery of Example 2, in which the viscosity of the electrolyte solution is 3.50 mPa·s or more. That is, it is clear that even in a battery in which a fluorinated solvent is used for a nonaqueous electrolyte and mix layers have grooves, rapid discharge cycle characteristics at 45° C. is unlikely to be improved if the viscosity of an electrolyte solution is not 3.50 mPa·s or more.

From results in Tables 1 and 2, it is clear that a battery with improved rapid discharge cycle characteristics at each temperature can be obtained by satisfying requirements that a fluorinated solvent is used for a nonaqueous electrolyte, mix layers have grooves, and the viscosity of an electrolyte solution is 3.50 mPa·s or more.

INDUSTRIAL APPLICABILITY

The present disclosure is applicable to nonaqueous electrolyte secondary batteries.

REFERENCE SIGNS LIST

10 Nonaqueous electrolyte secondary battery
11 Positive electrode
12 Negative electrode
13 Separator
14 Electrode assembly
15 Case body
16 Sealing body
17, 18 Insulating plate
19 Positive electrode lead
20 Negative electrode lead
21 Projecting section
22 Filter
22a Filter openings
23 Lower valve disc
24 Insulating member
25 Upper valve disc
26 Cap
26a Cap openings
27 Gasket
30 Negative electrode current collector
31 Negative electrode mix layers
32 Grooves

The invention claimed is:

1. A nonaqueous electrolyte secondary battery comprising a positive electrode including a positive electrode mix layer, a negative electrode including a negative electrode mix layer, and a nonaqueous electrolyte containing a nonaqueous solvent,
   wherein a surface of at least one of the positive electrode mix layer and the negative electrode mix layer is provided with grooves
   the nonaqueous electrolyte contains 10 volume percent or more of a fluorinated solvent with respect to the volume of the nonaqueous solvent and has a viscosity (25° C.) of 3.50 mPa·s or more as measured with a differential pressure viscometer, and
   the grooves are placed at a spacing of 1.3 mm to 4.0 mm.

2. The nonaqueous electrolyte secondary battery according to claim 1, wherein the fluorinated solvent is a cyclic fluorinated solvent.

3. The nonaqueous electrolyte secondary battery according to claim 2, wherein the cyclic fluorinated solvent is fluorinated ethylene carbonate.

4. The nonaqueous electrolyte secondary battery according to claim 1, wherein the positive electrode and the negative electrode are wound with a separator therebetween to form a wound electrode assembly and
   the grooves are placed across the full width of at least one of the positive electrode mix layer and the negative electrode mix layer.

5. The nonaqueous electrolyte secondary battery according to claim 4, wherein the grooves are placed at the spacing of 1.3 mm to 4.0 mm in a longitudinal direction of at least one of the positive electrode mix layer and the negative electrode mix layer and have a depth corresponding to 10 percent to 30 percent of the thickness of a corresponding one of the mix layers and a width of 0.1 mm to 1.0 mm.

6. The nonaqueous electrolyte secondary battery according to claim 1, wherein the positive electrode mix layer contains a positive electrode active material that mainly contains a lithium-nickel composite oxide in which Ni accounts for more than 80 mole percent of the total amount of metal elements excluding Li.

* * * * *